United States Patent [19]
Amano et al.

[11] Patent Number: 4,972,099
[45] Date of Patent: Nov. 20, 1990

[54] SENSOR CARD

[75] Inventors: Hideaki Amano, Urawa; Yoshiaki Kudo, Chiba, both of Japan

[73] Assignee: Dai Nippon Printing Co., Ltd., Tokyo, Japan

[21] Appl. No.: 302,293

[22] Filed: Jan. 27, 1989

[30] Foreign Application Priority Data

Jan. 30, 1988 [JP] Japan ................................ 63-20925

[51] Int. Cl.⁵ ...................... H03K 3/126; H03K 3/335
[52] U.S. Cl. ..................................... 307/303; 307/311
[58] Field of Search ....................... 357/25, 31, 74, 75; 307/303, 311, 303

[56] References Cited

U.S. PATENT DOCUMENTS 4,106,046  8/1978  Nathanson et al. .................... 357/41
4,601,545  7/1986  Kern ............................... 350/347 V
4,786,309  11/1988  Norton ............................. 307/299.1
4,797,723  1/1989  Nishimura et al. ................... 357/41

Primary Examiner—Stanley D. Miller
Assistant Examiner—Richard Roseen
Attorney, Agent, or Firm—Armstrong, Nikaido, Marmelstein, Kubovcik & Murray

[57] ABSTRACT

A sensor card includes a signal card substrate in which are mounted a sensor for sensing an external physical phenonemon and for converting the sensed physical phenomenon into an electric signal. An integrated circuit processes the output of the sensor and stores the sensed value represented thereby in a memory. An output terminal outputs the sensed value stored in the memory of the integrated circuit. The sensor card can be adapted not only to store signal-processed detection values but also to have a function for subjecting these signals to computation or evaluation. The stored data can be read out to an external unit in the form of a signal through a physical contact or magnetically in contactless fashion.

8 Claims, 3 Drawing Sheets

SENSOR CARD

FIELD OF THE INVENTION

This invention relates to a sensor card in which a sensor for sensing external physical phenomena is mounted on a card substrate. More particularly, the invention relates to a sensor card in which signal and data processing of the results of detection is executed by the sensor card itself, the detected values and processed data are stored in the card and can be read out to an external unit.

BACKGROUND OF THE INVENTION

Cards have been proposed wherein a substance which undergoes a change due to temperature, humidity, radiation dose or the like is partially painted on or affixed to a card substrate and performs the function of a sensor. For example, a card is known wherein the surface of the card is printed upon with a liquid crystal capsule ink the color of which changes with a change in temperature.

Cards of this type are simple in structure and easy to manufacture but the results of detection can be ascertained only by a change in color or the like and cannot be read directly from the card as an electric signal. In addition, transitory values obtained during detection can only be ascertained qualitatively, there is no way that the results of detection can be accumulated quantitatively, and a change with the passage of time cannot be stored. Consequently, these sensor cards can only be used in very limited applications.

The specification of Japanese Patent Application Laid-Open (KOKAI) No. 62-289727 discloses a sensor card comprising a sensor for sensing an environmental condition such as temperature and outputting an electric signal indicative of the condition sensed, a microprocessor, to which the electric signal from the sensor is applied as an input, for determining whether the value indicated by the signal lies within predetermined allowable limits, and display means for displaying the results of the determination made by the microprocessor.

However, when a value sensed by the sensor falls outside the allowable limits, this proposed sensor card merely causes the display means, which can be any suitable means such as a liquid crystal display device, to present a display to the effect that an abnormal state has occurred. The card is incapable of accumulating the results of measurement, and such results cannot be read out of the card to an external device. Accordingly, the display means must be monitored constantly and it is not possible to keep track of a change in an environmental condition with the passage of time.

Further, the specification of Japanese Patent Application Laid-Open (KOKAI) No. 61-58793 discloses an IC medical examination card comprising a temperature sensor for sensing body temperature, a display section for displaying body temperature sensed by the temperature sensor, and a memory for storing the body temperature sensed by the temperature sensor The card is so adapted that body temperature data stored in the memory can be read out to an appropriate terminal.

However, this IC medical examination card is utilized for very special purposes, namely the monitoring of a patient's body temperature and the supervision of medication. In actuality, measurement of body temperature is performed in response to pressing of a switch by the patient himself, meaning that the card is not adapted to enable measurement of temperature at desired time intervals. Consequently, human intervention is a requisite, general external physical phenomena cannot be measured automatically and continuously, and it is not possible to keep track of a change in these physical phenomena with time.

The specification of Japanese Patent Application Laid-Open (KOKAI) No. 62-265525 discloses an environmental sensing card comprising a sensor for outputting an electric signal commensurate with a change in the environment, decision means which, upon receiving the electric signal from the sensor, determines whether the measured value lies within allowable limits, a timer for measuring time, memory means for storing the results of the determination made by the decision means, measurement data and the prevailing time, and display means for displaying the results of determination, the measurement data and the time. In this environmental sensing card, however, the results of determination, the measurement data and the like are merely displayed by the display means disposed on the card and cannot be output to an external device. As a result, this card does not readily lend itself to tracing of a change in measurement data with the passage of time.

SUMMARY OF THE INVENTION

The present invention has been devised in view of the foregoing drawbacks of the prior art and its object is to provide a highly portable sensor card in which an external physical phenomenon can be sensed and the sensed value subjected to signal and data processing and the results of processing stored, and in which the stored data can be read out to an external device.

According to the present invention, the foregoing object is attained by providing a sensor card comprising a sensor for sensing an external physical phenomenon and for converting the sensed physical phenomenon into an electric signal and outputting the electric signal, an integrated circuit, having a memory, for processing the electric signal from the sensor and storing a sensed value in the memory, an output terminal for outputting the sensed value stored in the memory of the integrated circuit, and a single card substrate in which the sensor, the integrated circuit and the output terminal are mounted.

The sensor used can by any transducer which converts an external physical phenomenon into an electric signal. Examples, which depend upon the particular physical phenomenon, are a temperature transducer element utilizing the Seebeck effect for temperature-related measurements, a thermoelectric transducer element utilizing the thermoelectron effect in electron emission-related measurements, a Hall device utilizing the Hall effect and an electromagnetic resistance element utilizing the magnetic resistance effect in electromagnetic measurements, and a piezoelectric transducer element utilizing the piezoelectric effect in piezoelectric-related measurements. Other examples are elements utilizing various effects in measurements related to light, sound, metals, magnetism, photoelectricity, radiation and chemistry.

The output of the sensor is input to the integrated circuit (IC), which ordinarily is constituted by a single chip. Before the output is applied to a microprocessor within the integrated circuit, the signal is preprocessed by a signal preprocessor circuit within an I/O interface.

Examples of the signal preprocessor circuit, which depend upon the type of sensor, are an amplifier circuit for amplifying the sensor output if the output is very small, an impedence converting circuit for making a high-to-low impedence conversion if the sensor output has a high impedence, an effective value converting circuit for converting the sensor output into a root-mean-square value and delivering a DC output if the sensor output is an AC signal, a current-voltage converting circuit for converting a sensor current output into a voltage, a logarithmic compressing circuit for effecting compression using a logarithmic circuit if the sensor output has a wide dynamic range, a filtering circuit for removing noise components if the sensor output includes such noise components, and a gain control circuit for adjusting gain.

If the sensor output is an analog value, the signal is input upon converting the output into a digital value by an analog-digital (A-D) converter. Examples of the A-D converter are a single-, dual- or triple-strobe integrating-type converter, or a successive integrating-type converter which compares input voltage with the analog output value of a D-A converter. The digital data obtained by the A-D converter can be subjected to signal correction and compensation using a look-up table. The look-up table can be altered by an external operation.

One or a plurality of sensors can be provided. In the latter case, a multiplexer can be employed in order to operate the A-D converter efficiently. If time-sharing processing is executed by the multiplexer with regard to a plurality of sensor outputs, these sensor outputs can be processed simultaneously.

Furthermore, if a signal exhibits a rapid change, a sample-and-hold circuit can be provided to convert the signal correctly.

The sensor card of the present invention can be adapted not only to store signal-processed detection values but also to have a function for subjecting these signals to computation or evaluation. More specifically, after the pertinent data is processed by the microprocessor incorporated in the card substrate, the processed data can be stored in a RAM (random-access memory). The microprocessor operates in accordance with a control program stored in a ROM (read-only memory) incorporated in the card substrate. Though the contents stored in the ROM may be fixed, it is permissible to adopt an arrangement using an EE-PROM in which these contents can be rewritten from the outside. For example, such an arrangement will make it possible to adjust sensor sensitivity, modify the sampling rate in the case of time-sharing processing, or modify a threshold value during a control operation.

Data obtained by digitizing the sensor output or data which has been processed is stored in the RAM incorporated in the card substrate. The data stored in the RAM can be read out to an external unit in the form of a signal through a physical electrical contact or magnetically in a non-contact manner.

Further, it is possible to adopt an arrangement in which the data based on the sensor output is not merely fetched from the abovementioned contact. That is, any of various light-emitting, sound-emitting and oscillating elements can be mounted on the card substrate and adapted to generate a signal discernible by any of the five human senses when the sensor output exceeds a certain threshold value.

There are various methods of starting and ending the card function, namely the operation for processing and accumulating sensor outputs. For example, an arrangement can be adopted in which operation is started and ended artificially using a switch such as a pushbutton, or in which operation starts when the sensor output exceeds a certain value and stops when the sensor output falls below a certain value. Furthermore, the sensor card can be provided with an internal timer for limiting operating time or for sampling the sensor output at a fixed time interval.

The following are some examples of specific methods of utilizing the sensor card of the invention:

(a) A sensor card capable of sensing temperature can be disposed at several locations in an isothermic bath for the purpose of measuring the temperature distribution thereof.

(b) In a situation where food or living things are transported while kept in a constant environment (temperature and humidity), the temperature and humidity of the environment during transport can be recorded by using the sensor card.

(c) A sensor card capable of sensing a dose of radiation can be worn by a worker in a radiationrelated industry to record exposure over a period of 24 hours.

(d) A sensor card capable of sensing a dose of ultraviolet radiation can be affixed to food to measure the actual amount of ultraviolet irradiation received when the food is are passed under an ultraviolet lamp.

(e) A sensor card capable of sensing pressure and temperature can be disposed at various locations in a reaction vessel to measure the pressure and temperature of a reaction gas.

(f) The pulsatory motion of an individual's heart can be recorded within the sensor card, the sensor card is worn by the individual during exercise, the pulsatory motion of the heart sensed by the sensor is compared with the value of pulsatory motion already recorded, and the microprocessor issues a warning when it determines that the sensed pulsatory motion is abnormal.

Still other objects and advantages of the invention will in part be obvious and will in part be apparent from the specification.

The invention accordingly comprises the features of construction, combinations of elements and arrangement of parts which will be exemplified in the construction hereinafter set forth, and the scope of the invention will be indicated in the claims

DESCRIPTION OF THE PREFERRED EMBODIMENTS

Embodiments of the present invention will now be described in detail with reference to the drawings.

Figure 1A:
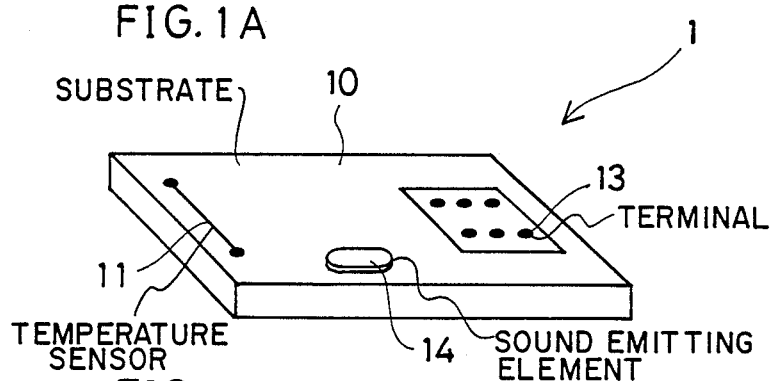
FIG. 1(A) is a perspective view illustrating a first embodiment of a sensor card according to the present invention.
Figure 1B:
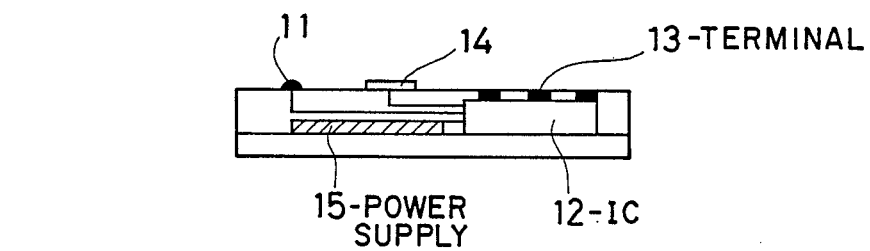
FIG. 1(B) is a sectional view illustrating the sensor card of FIG. 1(A)
Figure 2:
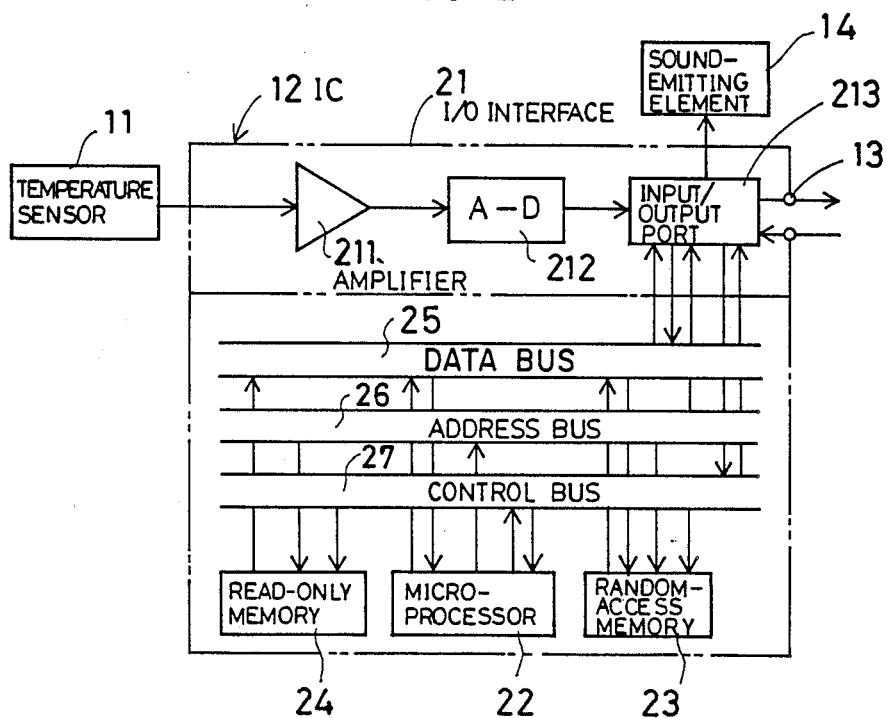
FIG. 2 is a block diagram illustrating an integrated circuit incorporated in the sensor card of FIG. 1.

FIG. 1(A) is a perspective view illustrating a first embodiment of a sensor card according to the present invention, FIG. 1(B) is a sectional view illustrating the sensor card of FIG. 1(A), and FIG. 2 is a block diagram illustrating an integrated circuit incorporated in the sensor card of FIG. 1.

A sensor card 1 according to the first embodiment of the invention is capable of sensing temperature. When food or living things which are required to be maintained at a low temperature are transported, the sensor card 1 can be used to detect and record the temperature of the environment during transport.

As shown in FIGS. 1A and 1B, the sensor card 1 comprises a card substrate 10, a temperature sensor 11, an IC chip 12, a terminal 13 for external connection, a sound-emitting element 14 and a power supply 15.

The card substrate 10 is formed using a resin such as polyether sulfone resin (PES) and has one side on which the temperature sensor 11 is mounted.

The temperature sensor 11 is a transducer which senses a change in temperature as an electric signal. For example, an element which employs a chromel-alumel thermocouple can be used. The output of the temperature sensor 11 is connected to the IC chip 12 via a connecting line provided within the card substrate 10.

As will be set forth below, the IC chip 12 is a single-chip type IC which performs signal processing and data processing, reads and writes programs or data, etc. The IC chip 12 is provided with the external connection terminal 13 as by vapor deposition or welding so that stored data can be read out to an external device. When a sensed value is a value indicative of a preset condition, the sound-emitting element 14 is made to generate a warning signal tone in response to a determination made by a microprocessor 22.

The power supply 15, which is a battery or the like for operating the sensor 11, IC chip 12, sound-emitting element 14 and other components, is imbedded within the card substrate 10.

The operation of this temperature sensing card will now be described along with the circuitry within the IC chip 12 in conjunction with FIG. 2.

It is assumed here that the sensor card is inserted in a transport container employed when transporting vegetables maintained at a low temperature.

Temperature during transport is sensed by the temperature sensor 11, the output of which is amplified by an amplifier 211 in an I/O interface 21. The amplified signal is converted into a digital signal by an A-D converter 212, and the digital signal is fed into the microprocessor 22 via an input/output port 213.

In accordance with a control program stored in a ROM 24, the sensed temperature and an allowable temperature are compared by the microprocessor 22. When the sensed temperature value is outside allowable limits, the microprocessor 22 causes the sound-emitting element 14 to generate a predetermined warning tone via input/output port 213. The sensed temperature is stored in a data memory within the RAM 23 at a fixed period determined by a clock circuit incorporated in the microprocessor 22.

At the end of transport, the data stored in the RAM 23 can be read out from the external connection terminal 13 to an external device such as a personal computer by means of a card reader or the like via the input/output unit 213. This will enable the data to be subjected to two-dimensional processing or to be recorded.

Figure 3:
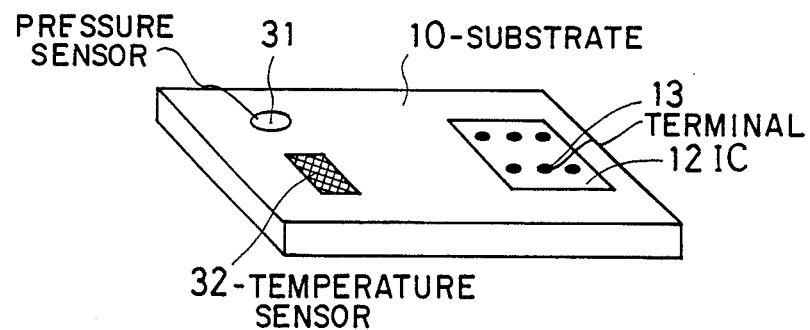
FIG. 3 is a perspective view illustrating a second embodiment of a sensor card according to the present invention.
Figure 4:
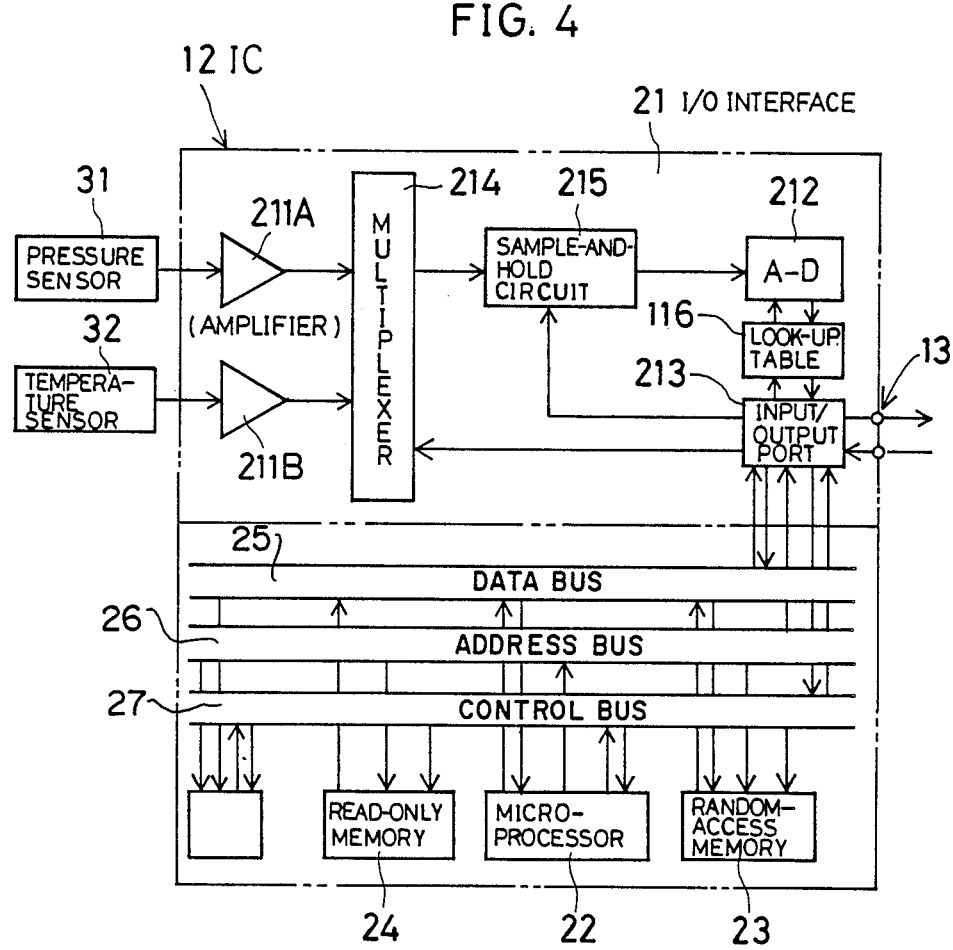
FIG. 4 is a block diagram illustrating an integrated circuit incorporated in the sensor card of FIG. 3.

FIG. 3 is a perspective view showing a second embodiment of a sensor card according to the present invention, and FIG. 4 is a block diagram illustrating an integrated circuit incorporated in the sensor card of the second embodiment. Portions which perform functions similar to those in the first embodiment are designated by like reference characters.

The sensor card of the second embodiment has two sensors mounted thereon, namely a pressure sensor 31 and a temperature sensor 32. The sensor card is attached to a plurality of locations on the outer wall surface of a mobile object such as an automotive vehicle or aircraft and is adapted to record pressure and temperature at each of the locations during travel.

The pressure sensor 31 is one using a strain gauge, and the temperature sensor 32 utilizes the thermoelectric effect.

The outputs of sensors 31, 32 are input to a multiplexer 214 upon being amplified by respective amplifiers 211A, 211B. In response to a control signal from the microprocessor 22, the multiplexer 214 selectively connects the outputs from the sensors 31, 32 to a sample-and-hold circuit 215. The latter responds to a control signal from the microprocessor 22 by sampling the analog signal input thereto and temporarily holding the sampled value. This value is connected to the A-D converter 212. The latter converts this value into a digital signal, which it then delivers to the input/output port 213 via a look-up table 116. The look-up table 116 is for correcting and compensating the digitized data signal. The input data from the input/output port 213 is fed into the microprocessor 22 via a data bus 25.

The microprocessor 22, which operates in accordance with the control program stored in the ROM 24, compares the sensed values processed as described above with preset safe values of pressure and temperature at various locations of the mobile body and stores a sensed value in the RAM 23 only when this value exceeds the safe value.

The data stored in the RAM 23 can be read out to an external device from the external connection terminal 13, and the effects of the traveling condition of the mobile body on its outer wall can be investigated based on the read data.

Figure 5:
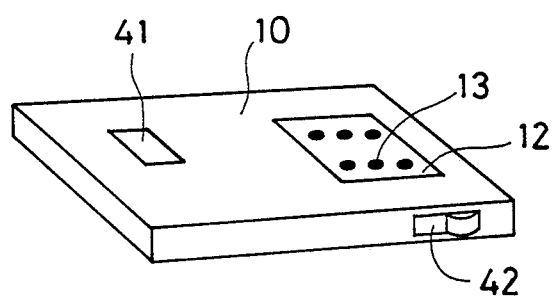
FIG. 5 is a perspective view illustrating a third embodiment of a sensor card according to the present invention.

FIG. 5 is a perspective view showing a third embodiment of a sensor card according to the present invention.

As shown in FIG. 5, the sensor card of the third embodiment is provided with a temperature sensor 41 for measuring body temperature. The internal circuitry of this sensor card can be implemented by the circuitry of FIG. 2 minus the sound-emitting element. Closing a power supply switch 42 starts the sensing operation, with sensed temperature merely being recorded with time by the internal integrated circuit. This data can be extracted from the external connection terminal 13 and delivered to an external device.

As will be apparent from the foregoing description, the present invention makes it possible to sense an external physical phenomenon, subject the resulting value to signal and data processing, store the processed result in an internal memory and, if required, extract the data for delivery to an external device. This allows a physical quantity which prevails over a specific period of time to be sensed and totaled, and makes it possible to keep track of a change in the physical quantity with time.

Since the sensor has the form of a card, it can be readily transported and carried, and data sensed by the sensor can be accumulated offline. Accordingly, the sensor can be placed at any location on a measured subject and can be affixed even to a subject which is a mobile body. Various physical quantities can be sensed without elaborate equipment.

As many apparently widely different embodiments of the present invention can be made without departing from the spirit and scope thereof, it is to be understood that the invention is not limited to the specific embodiments thereof except as defined in the appended claims.

What we claim is:

1. A sensor card comprising:
   a sensor for sensing an external physical phenomenon, for converting the sensed physical phenomenon into an electric signal and for outputting said electric signal;
   an integrated circuit having a memory, said integrated circuit processing the electric signal from said sensor and storing a sensed value represented by said electric signal in said memory;
   an output terminal for outputting the sensed value stored in said memory to a device which is external to said sensor card; and
   a single card substrate in which said sensor, said integrated circuit and said output terminal are mounted.

2. A sensor card as claimed in claim 1 further comprising a power switch which starts said sensor sensing the external phenomenon.

3. A sensor card as claimed in claim 1, wherein said integrated circuit includes a timing means for at least one of limiting operating time and sampling sensor output at a predetermined time interval.

4. A sensor card comprising:
   a single card substrate provided with
      a sensor card for sensing an external physical phenomenon and for converting the sensed physical phenomenon to an electric signal;
      an integrated circuit for processing the electric signal from said sensor and for storing a sensed value represented by said electric signal in a memory thereof;
      an output terminal, connectable with an external device, outputting the sensed value stored in said memory of said integrated circuit to said external device; and
      a power supply supplying electric power for operation of said sensor and said integrated circuit.

5. A sensor card as set forth in claim 4, wherein said integrated circuit is provided with a means for computing and for processing the output of said sensor and for continuously storing the sensed value in said memory.

6. A sensor card as set forth in claim 4 wherein said integrated circuit is provided with an internal timer for limiting operation time.

7. A sensor card as set forth in claim 4, wherein a power switch is furnished for on-off operation of said power supply.

8. A sensor card as set forth in claim 4, wherein, said integrated circuit is provided with an internal timer which samples the sensor output at a predetermined time interval.

* * * * *